April 28, 1953
C. E. EVERETT ET AL
2,636,329
TABLE FOR CORN FORAGE HARVESTERS
Filed May 4, 1950
2 SHEETS—SHEET 1
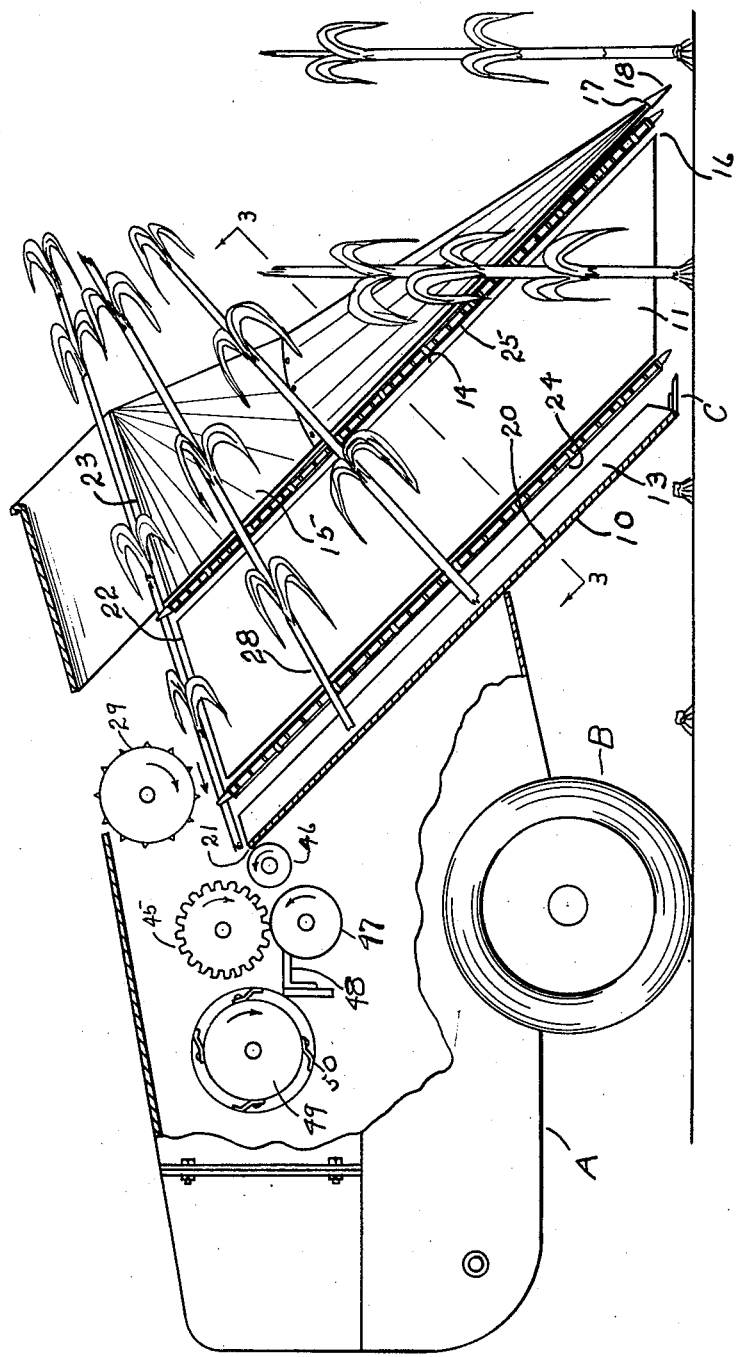
INVENTORS
CHARLES E. EVERETT
DOUGLAS C. MC. CUAIG
BY *ASKrob*
ATTORNEY INVENTORS
CHARLES E. EVERETT
DOUGLAS C. MC. CUAIG
BY A.S. Krob
ATTORNEY Patented Apr. 28, 1953

2,636,329

UNITED STATES PATENT OFFICE 2,636,329

TABLE FOR CORN FORAGE HARVESTERS

Charles E. Everett and Douglas E. McCuaig, Racine, Wis., assignor to The Massey-Harris Company, Racine, Wis., a company of Maryland Application May 4, 1950, Serial No. 159,902

1 Claim. (Cl. 56—60)

The present invention relates to a table for corn forage harvester and has for its object generally stated a machine that is more efficient in its operation than conventional machines in that novel provisions are made to prevent clogging.

It has always been a difficult matter to cut free the corn stalks, elevate them and feed them into the chopping cylinder without more or less clogging particularly just before the stalks are fed into the chopping machine.

The principal trouble with machines of the character has been in clogging of the stalks after they have been released by the elevator chains and before reaching the feeding and cutting mechanism. The stalks are cut from rows of drilled corn and are elevated through a narrow passageway and the chopping mechanism is positioned transverse of the rows and in order to operate successfully, the corn must be scattered or moved transversely to prevent clogging and distribute the stalks across the cylinder for efficient operation.

We accomplish the foregoing desired results by supplying a pair of vertically spaced chains on the left side of the path of the corn, facing the direction of travel each having engaging fingers which protrude through slots in a vertical panel which is angled toward the right end of the chopping cylinder and then urge the stalks toward the left to distribute the stalks across the length of the cylinder, the fingers being caused to gradually recede as they move along the transverse path so that by the time the fingers reach the end of the path they completely disengage the corn stalks which are then evenly distributed for the length of the cylinder.

To these and other useful ends, our invention consists of parts, combinations of parts or their equivalents and mode of operation as hereinafter described and claimed and shown in the accompanying drawings in which:

Fig. 1 is a side elevational view with parts in section of our improved forage harvester, a portion of which is cut away on lines 1—1 of Figure 2.

Figures 2, 3:
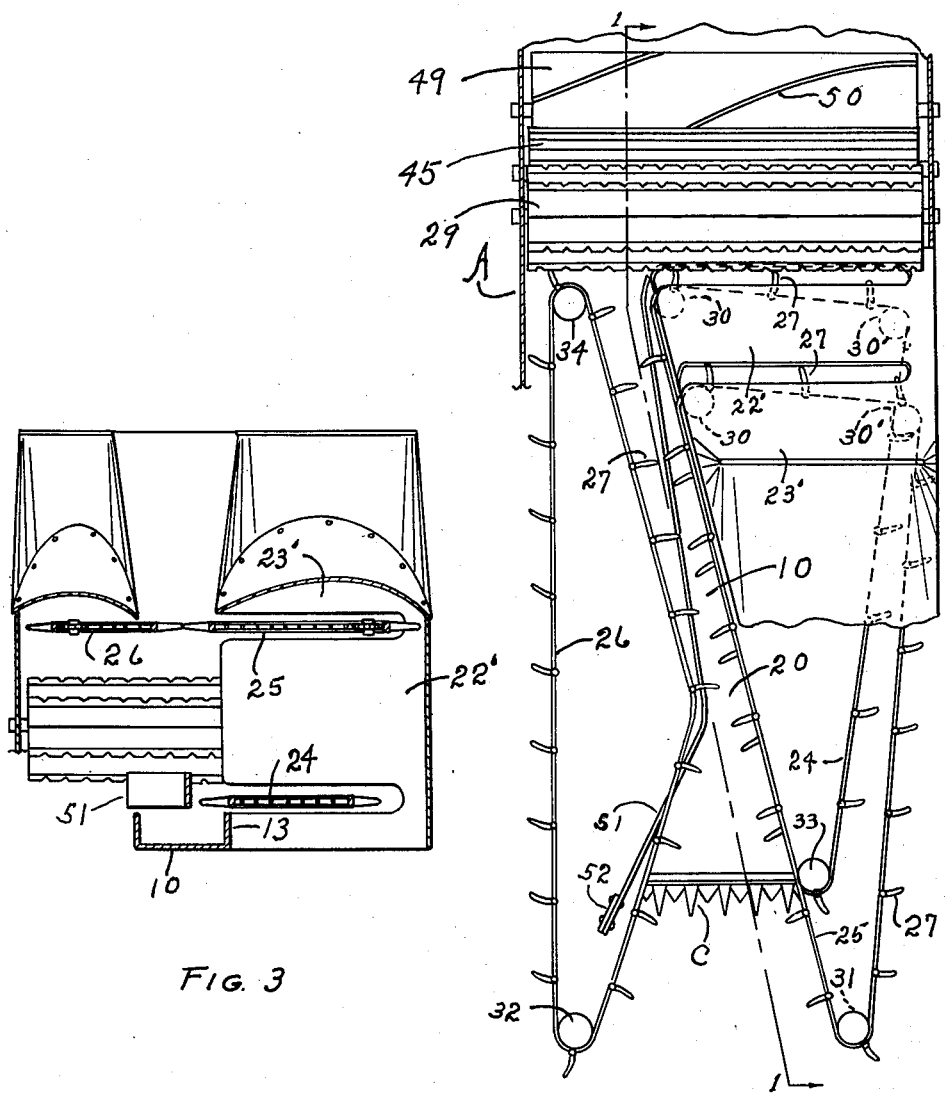
Fig. 2 is a fractional top view of the device as shown in Figure 1 with parts in section.
Fig. 3 is a sectional view taken on line 3—3 of Figure 1.

As thus illustrated the frame of the device is designated by reference character A which is preferably adapted to be carried on wheels B positioned about as shown and on opposite sides of the frame, the frame preferably having a forwardly extending hitching means (not shown) for attachment to a tractor and being hinged to member A on its rear end with manually controlled means for determining the height of a cutter bar C which is adapted to cut the stalks off in any conventional manner, it being understood that the hitch means is at one side of frame A so the tractor may be driven along side the row of stalks being cut.

In the operation of our device, means are provided for elevating the stalks after they have been cut free and tilting them forward as they travel upwardly with their lower ends resting in a trough designated by reference character 10.

We secure to the left flange of trough 10 a plate 11 with its lower edge positioned a short distance above the left hand flange 13 of trough 10. The upper edge of plate 11 terminates as at 14. Another plate 15 is positioned in alignment with plate 11 and a short distance above this plate.

Plates 14 and 15 are shaped about as shown, their forward ends terminating as at 16 and 17. A gathering point 18 is secured to the forward end of plate 15, members 14 and 15 being suitably secured to frame A. On the right hand side of frame A, a plate (not shown) and a gathering point not shown are provided and secured to the frame, somewhat similar to the left hand plates 14 and 15.

Trough 10, it will be noted has its front entranceway secured to cutter bar C, the cutter bar and the forward end of the trough being somewhat wider than the main part of the trough, the flanges of which are in parallel relation extending from point 20 rearwardly, terminating as at 21. Plates 14 and 15 terminate at their rear ends as at 22 and 23 at which point these plates extend to the left as at 22' and 23' and the open space between the left hand flange of trough 10 and plates 14 and 15 intersecting transverse open spaces between members 22' and 23'.

We provide three sprocket chains 24, 25 and 26, each having spaced prongs 27, the chains being positioned so these prongs protrude through the spaces and overhang trough 10. Thus after the stalks are cut free, the prongs will be caused to engage the freed stalks. Lower chain 24 is driven at a greater speed than chains 25 and 26. Thus as the chain prongs engage the stalks and slide them rearwardly with their ends resting in trough 10, the stalks 28 will be caused to lean forwardly so that when they arrive at their rearmost position, they will be about in the position shown in Figure 1.

We provide means, whereby when the stalks are delivered at the rear end of trough 10, they are free to travel to the left on plates 22' and 23' and drop downwardly on these plates in front of beater 29. Prongs 27 of chains 24 and 25 first protrude fully past plates 22' and 23' as illustrated so the stalks are urged to travel toward the left. It will be noted by scrutinizing Figure 2 that sprockets 30 and 30' on which chains 24 and 25 are carried, are at a transverse angle so as to cause prongs 27 to gradually disappear under plates 22' and 23' so the stalks are completely released and stripped from the prongs before they reach the left end of the machine.

Thus it will be seen that the stalks will be positively distributed to the left and contacted by beater 29, the other sprockets 31, 32, 33 and 34 are positioned as shown in Figure 2.

Thus it will be seen that the corn stalks will be carried rearwardly and deposited on plates 22' and 23' where they will be started downwardly in direction of the arrow by beater 29 and gravity.

We preferably provide three other beaters or feeder rollers 45, 46 and 47 which are driven in the direction indicated by curvilinear arrows and engage the stalks and move them on top of cutter plate 48 and into chopper cylinder 49 which has suitably shaped cutter blades 50 and is turned at a suitable speed so the stalks are cut to the desired length and suitable for silo storage. When the cut stalks are delivered to the rear end of frame A, means are provided for engaging this material by an elevator or otherwise adapted to deliver the silage into a wagon.

We secure a flat spring 51 to the frame of the device as at 52. This spring is shaped as shown and will be caused to engage the stalks as they travel upwardly in the trough and yieldingly hold the stalks against plate 14, thus to prevent the stalks from becoming disengaged from prongs 27 as they travel rearwardly until all of the stalks have been discharged from trough 10 and into the space directly in rear of plates 22' and 23'.

The principal object of the present invention is to convey the cut free corn stalks as indicated in Figure 1, and release and distribute them to the left on plates 22' and 23' so the full length of cutter cylinder 49 will be actively and uniformly used. Thus it is thought that all necessary details of our device have been shown and described. It will be understood however that minor detail changes may be made in the device as shown without departing from the spirit and scope of our invention, as recited in the appended claim.

Having thus shown and described our invention, we claim:

In a forage harvester having a wheeled frame, cutting means carried at the forward end thereof, a chopping cylinder positioned transversely in said harvester above and to the rear of said cutting means, means defining a transversely positioned passageway forward of said cylinder, a trough extending upwardly and rearwardly from said cutting means and terminating at one end of said passageway, a pair of sprockets rotatably mounted in said frame and spaced along the length of said passageway, a third sprocket rotatably mounted in said frame at the forward end of said trough, an endless chain trained around said sprockets, prongs secured at spaced locations along the length of said chain to contact the crop material severed by said cutting means and convey said material rearwardly in said trough and along said passageway, plate means to strip said material from said prongs as the latter moves along the length of said passageway, a transversely positioned beater above said passageway and adapted to urge the said material into said cylinder.

CHARLES E. EVERETT.
DOUGLAS E. McCUAIG.

References Cited in the file of this patent

UNITED STATES PATENTS

| Number | Name | Date |
| --- | --- | --- |
| 1,462,765 | Miller | July 24, 1923 |
| 1,683,042 | Krogan | Sept. 4, 1928 |
| 1,786,850 | Johnston et al. | Dec. 30, 1930 |
| 1,791,302 | Eyres | Feb. 3, 1931 |
| 2,333,901 | Swenson | Nov. 9, 1943 |
| 2,385,193 | Burgin | Sept. 18, 1945 |
| 2,442,520 | Van Sickle | June 1, 1948 |
| 2,456,404 | Good | Dec. 14, 1948 |